(12) United States Patent
Liberman et al.

(10) Patent No.: US 7,097,769 B2
(45) Date of Patent: Aug. 29, 2006

(54) METHOD OF BORON REMOVAL IN PRESENCE OF MAGNESIUM IONS

(75) Inventors: Boris Liberman, Tel Aviv (IL); Igal Liberman, Tel Aviv (IL)

(73) Assignee: I.D.E. Technologies Ltd., Kadima (IL)

( * ) Notice: Subject to any disclaimer, the term of this patent is extended or adjusted under 35 U.S.C. 154(b) by 96 days.

(21) Appl. No.: 10/469,092

(22) PCT Filed: Feb. 26, 2002

(86) PCT No.: PCT/IL02/00146

§ 371 (c)(1),
(2), (4) Date: Nov. 20, 2003

(87) PCT Pub. No.: WO02/068338

PCT Pub. Date: Sep. 6, 2002

(65) Prior Publication Data

US 2004/0094480 A1 May 20, 2004

(30) Foreign Application Priority Data

Feb. 26, 2001 (IL) .................................... 141642

(51) Int. Cl.
*B01D 61/00* (2006.01)
*B01D 15/04* (2006.01)
*B01D 63/00* (2006.01)
*A61M 1/16* (2006.01)

(52) U.S. Cl. .................... 210/652; 210/638; 210/651; 210/195.2; 210/257.2

(58) Field of Classification Search ............... 210/638, 210/651, 652, 195.2, 257.2
See application file for complete search history.

(56) References Cited

U.S. PATENT DOCUMENTS 5,250,185 A 10/1993 Tao et al.

(Continued)

FOREIGN PATENT DOCUMENTS

| JP | 59-213489 A | 12/1984 |
| JP | 8-206460 A | 8/1996 |
| JP | 09-220564 A | 8/1997 |
| JP | 9-290275 A | 11/1997 |

(Continued)

OTHER PUBLICATIONS

D. Prats et al, Analysis of the influence of the pH and pressure on the elimination of boron in reverse osmosis, Desalination 128 (2000) 269-273.*

(Continued)

*Primary Examiner*—Ana Fortuna
(74) *Attorney, Agent, or Firm*—Birch, Stewart, Kolasch & Birch, LLP

(57) ABSTRACT

A method of boron removal from saline water containing boron and magnesium or calcium salts including a multi-stage reverse-osmosis (RO) separation process and comprising the steps of a first stage RO separation at pH<8.2; a second stage RO separation over at least part of the first-stage permeate; a third stage RO separation over the second-stage brine. The method is characterized in that the second stage separation is carried at pH>9 and the brine concentration is limited to a degree preventing $Mg(OH)_2$ or $CaCO_3$ scaling on RO membrane surfaces, the permeate constitutes product water, and the brine contains boron and magnesium or calcium ions; the third stage separation is carried at weak-acid pH, whereby the bulk of the magnesium or calcium ions are separated with the brine, while the bulk of the boron ions are retained in the permeate. The method further comprises a fourth stage of separation over the third-stage permeate, where the bulk of the boron ions is separated from the third-stage permeate, and the permeate of the fourth stage constitutes product water with low boron content.

12 Claims, 2 Drawing Sheets

U.S. PATENT DOCUMENTS

| | | | |
|---|---|---|---|
| 5,766,479 A | 6/1998 | Collentro et al. | |
| 5,925,255 A | 7/1999 | Mukhopadhyay | |
| 6,054,050 A | 4/2000 | Dyke | |
| 6,113,797 A | 9/2000 | Al-Samadi | |
| 6,398,965 B1 * | 6/2002 | Arba et al. | 210/652 |
| 6,908,546 B1 * | 6/2005 | Smith | 210/137 |

FOREIGN PATENT DOCUMENTS

| | | |
|---|---|---|
| JP | 10-015356 A | 1/1998 |
| JP | 10-080684 A | 3/1998 |
| JP | 10-085743 A2 | 4/1998 |
| JP | 10-225682 A | 8/1998 |
| JP | 11-10146 A | 1/1999 |
| JP | 11-128922 A | 5/1999 |
| JP | 11-128923 A2 | 5/1999 |
| JP | 11-128924 A | 5/1999 |
| JP | 11-138165 A | 5/1999 |
| JP | 11-267645 A | 10/1999 |

OTHER PUBLICATIONS

JP publication 11-267645, machine translation, May 10, 1999.*

JP publication 11-0101146, machine translation, Jan. 19, 1999.*

Nadav Nissim, Desalination 124 (1999) 131-135.*

Yasumoto Magara et al.; Desalination, vol. 118, No. 1-3, Sep. 20, 1998, pp. 25-33.

* cited by examiner

METHOD OF BORON REMOVAL IN PRESENCE OF MAGNESIUM IONS

This application is the national phase under 35 U.S.C. § 371 of PCT International Application No. PCT/IL02/00146 which has an International filing date of Feb. 26, 2002, which designated the United States of America.

FIELD OF THE INVENTION

This invention relates to methods of water desalination and in particular to methods of boron ion removal from water containing magnesium salts.

BACKGROUND OF THE INVENTION

Desalination is a separation process used to reduce the dissolved salt content of saline water to a usable level. The saline feedwater is drawn from the sea or from underground sources (brackish water). The desalination process separates it into two output streams: low-salinity product water and very saline concentrate stream (brine or reject water). The product water of the desalination process is generally water with less than 0.5 g/L or 500 ppm TDS (Total Dissolved Solids), which is suitable for most domestic, industrial, and agricultural uses. A by-product of desalination is brine, which is a concentrated salt solution and is usually disposed of.

A typical membrane process used for desalination is the reverse osmosis (RO). As shown schematically in FIG. 1, in the RO process, saline feedwater 10 is pressurized by a pump 12 and fed into a pressure vessel 14. Pretreatment agent 16 may be added to condition the feedwater. RO membranes 18 are disposed in the vessel 14 across the flow path. The membranes 18 inhibit the passage of dissolved salts while permitting the desalinated product water (also called permeate) 20 to pass through. The permeate 20 is forced to flow through the membrane by the pressure differential created between the pressurized feedwater and the product water, which is at near-atmospheric pressure. Because no membrane is perfect in its rejection of dissolved salts, a small percentage of salt passes through the membrane and remains in the product water. The remaining feedwater is discharged through the pressurized side of the pressure vessel as brine 22.

Boron is contained in seawater in a typical concentration of about 4–5 ppm. In one RO desalination stage, its concentration is lowered to 1÷1.5 ppm, which is tolerated by humans. Some agricultural crops, however, are troubled with boron toxicity at low levels. For example, California standard for irrigation water is a maximum of 0.75 mg/L (0.75 ppm). In Israel, where the desalinated water is used in a unified system both for potable water and for irrigation, requirements to boron content are even more rigorous —0.2 ppm (0.2 mg/L). Some industrial applications, such as the manufacture of electronic parts, speciality foods, and pharmaceuticals, also require very low concentration of boron in water.

At present, such standards can only be met by the use of costly ion exchange resins. Membrane systems have failed to perform effectively due to scaling problems or insufficiently high rejection rates for boron. The above described reverse osmosis method allows to remove only 60% to 80% of boron ions, while the other ions are removed by more than 99%, usually 99.6%.

The RO membranes have low effect in separating boron ions at pH<9. This fact is due to some peculiarities in the dissociation of various boric acid forms in seawater. It is known that boron ions rejection by reverse osmosis membranes increases with increasing feedwater pH. However, seawater desalination by the RO method is not practical at pH>9 due to the crystallization of $CaCO_3$ and $Mg(OH)_2$ salts on the RO membranes (fouling).

The improvement of the RO membrane method for removing the boron ion from desalinated seawater has been addressed by a number of inventors. Prior art JP 11138165 suggests treatment of the feed water with antiscaling agent before RO processing at pH=9.2. U.S. Pat. No. 5,250,185 suggests removal of all bivalent cations (such as $Mg^{++}$) from feed water by treatment with water softener prior to RO process at pH>9.5. U.S. Pat. No. 5,925,255 suggests removal of hardness and non-hydroxide alkalinity from feed water in a weak acid cation ion exchange resin, then RO processing at pH>10.5.

Suggestions have been made to remove the boron ions before the RO treatment. JP 09220564 suggests adding a flocculant to feed water, forming boron-containing insoluble precipitate, and microfiltering. Similarly, JP 10225682 suggests adding a coagulant for the same purpose. JP 10080684 suggests adding sodium fluoride to boron-containing feed water in order to form a complex, which is then rejected by a RO membrane.

According to other suggestions, boron ions are removed after the RO desalination. JP 11128922 suggests treating the boron-containing permeate in one or two positively charged RO membranes. JP 11128923 removes the boron ion in a series of RO membranes. JP 10015356, JP 10085743, and JP 11128924 use various types of ion exchange devices after the RO membrane. However, this group of inventions does not address the membrane scaling at high pH.

Still other suggestions deal with processes with two or more stages of RO for successive removal of scaling salts and boron ions. JP 59213489 suggests adding chlorine agent to boron-containing feedwater, and a first-stage RO treatment through chlorine-resistant membrane to remove inorganic and organic salts, Ca and Mg salt, and a part of boron. Then the permeate undergoes a second stage separation by a permeable membrane having an N-identical bond in the —CONH—molecule. JP 9290275 suggests removing polivalent cations in a first stage RO device, then raising the alcalinity of the permeate to pH≧9 by adding lime and removing boron in a second stage RO device. JP 8206460 combines a first stage RO unit separating polivalent ions at pH=6.5, a second stage RO unit for separation of the first-stage permeate at pH=9.5 to 11, and a third-stage RO unit for separation of the second-stage brine. JP 11010146 suggests a two-stage RO separation at neutral pH, where the first stage permeate is collected in two flows, a first one from the high-pressure feed side of the pressure vessel, and a second one from the brine discharge side. The second flow is passed through a second stage RO and then the second stage permeate is mixed with the first flow.

JP 11267645 discloses a two-stage RO desalination method. The boron containing feed water is acidified, deaerated, and passed through a first stage RO device. Then the water is conditioned to pH≧9.2 and treated in a second stage RO device.

SUMMARY OF THE INVENTION

In accordance with the present invention, there is provided a method of deep boron removal from water containing boron and magnesium salts in a multi-stage reverse-osmosis (RO) separation process. The method comprises: a first stage RO separation at pH<8.2; a second stage RO separation over the first-stage permeate at pH>9, wherein the brine concentration is limited to a degree preventing $Mg(OH)_2$ scaling on RO membrane surfaces, the permeate constituting product water, and the brine containing boron and magnesium ions; a third stage RO separation over the second-stage brine at weak-acid pH, wherein the bulk of the magnesium ions are separated with the brine, while the bulk of the boron ions are retained in the permeate; and a fourth stage RO separation over the third-stage permeate at pH>9, wherein the bulk of the boron ions is separated with the brine, and the permeate constitutes product water with low boron content.

A part of the permeate at the first separation stage may be collected from RO membranes at the upstream side of the RO vessel (front permeate). This part has lower concentration of boron than the rest of the permeate, and may be used for obtaining final product water by mixing with the product water from the second and the fourth stage. The collection of front permeate provides for an effective way to maintain the concentration of boron in the final product water at a predetermined level under variable temperature of the entrant saline feedwater: the rate of collection is reduced at higher feedwater temperature.

The proposed multi-stage desalination and boron removal method provides the benefits of:
- high product yield, about 98% of the second stage feedwater flow,
- low specific power consumption since almost all entrant water passes the boron removal stages and is transformed into product water, with less than 2% being rejected;
- low consumption of chemicals, since acidifying and $CO_2$ removal from the first stage feedwater may be skipped, as far as the second stage operates at low brine concentration, and $Mg(OH)_2$ and $CaCO_3$ scaling does not occur;
- low capital investment when both low boron content and low TDS content are required in the product water; and
- flexibility and easy adjustment to changes of the feedwater temperature.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF THE INVENTION

Figure 1:
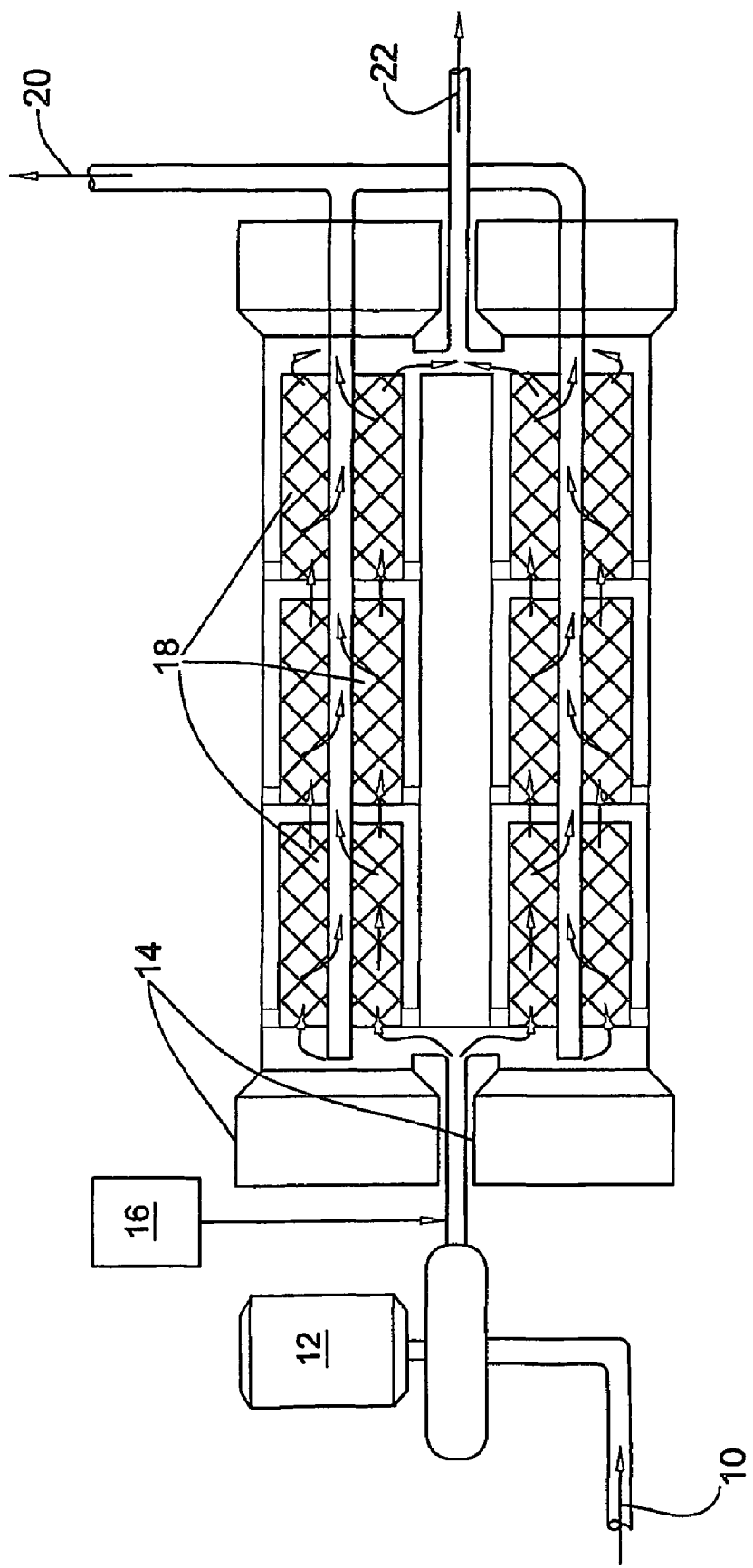
FIG. 1 is a schematic layout of a typical reverse osmosis pressure vessel.
Figure 2:
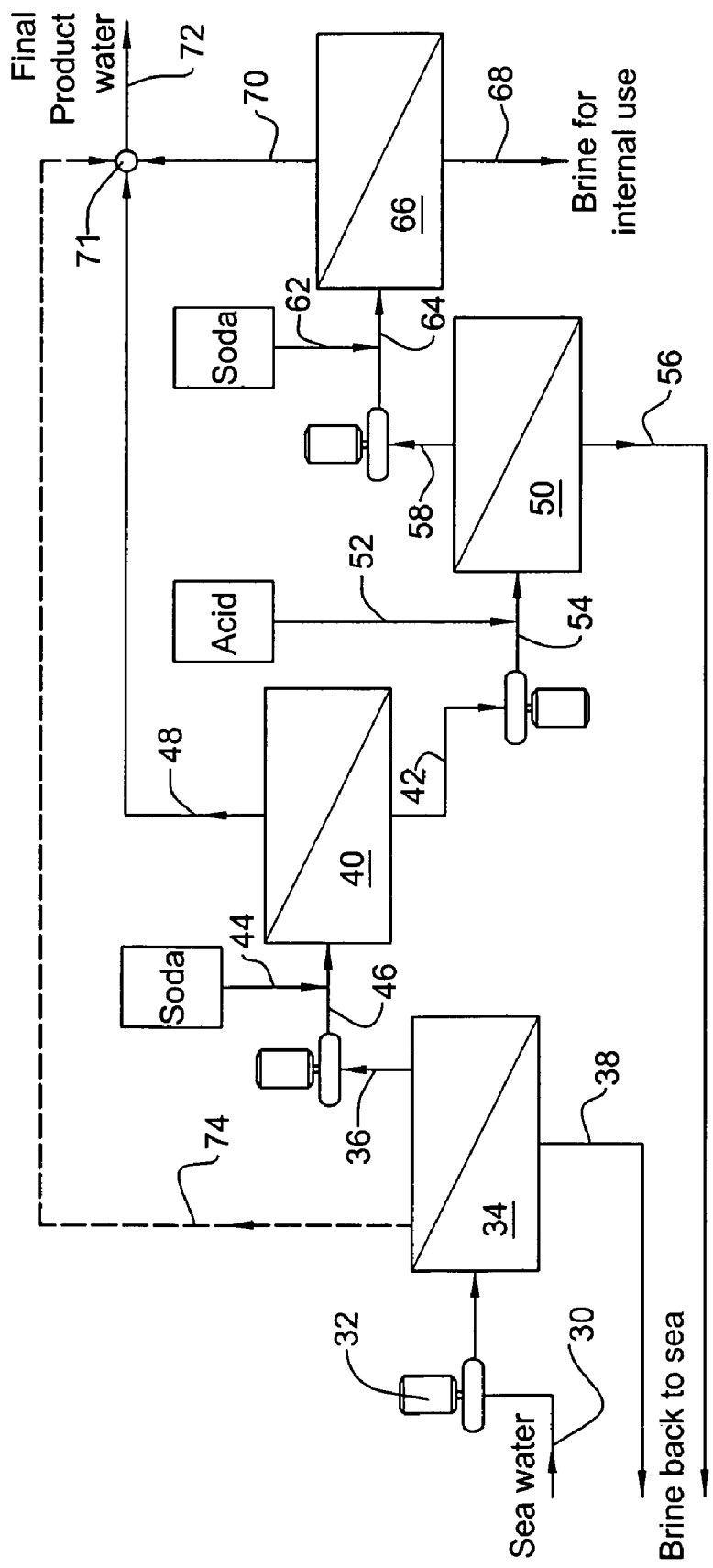
FIG. 2 is a schematic layout of a multi-stage desalination plant for boron removal according to the method of the present invention.

A the method of the present invention implemented in a four-stage seawater desalination plant is illustrated in FIG. 2. Feedwater 30, taken from the sea, is pressurized by a high-pressure pump 32 and is fed into the pressure vessel of the first stage 34 for reverse-osmosis separation into permeate 36 and brine 38. The first stage desalination is done in the standard way at pH<8.2. However, acidifying of the feedwater and $CO_2$ removal before the first stage may be omitted because the second stage operates with low brine concentration, as will be explained below.

Desalinated water obtained as first-stage permeate 36 contains about 1–1.5 ppm boron ions and a certain quantity of $Mg^{++}$ ions. The rest of ions contained in the first stage permeate play a less significant role in the process and will not be discussed further. The presence of magnesium ions does not allow to achieve, in one desalination stage, high pH>9 and high brine concentration, since those conditions lead to intensive crystallization of $Mg(OH)_2$ on the membrane surface.

According to the present invention, in the second stage pressure vessel 40, the desalination is carried at pH>9 but the brine 42 is concentrated to a degree lower than the saturation level, thus preventing the scaling (crystallizing) $Mg(OH)_2$ on membranes' surface. The brine concentration in this stage does not exceed 70–85%. The higher pH at the second stage may be achieved by adding soda 44 to the feedwater 46 or by any other means. The second stage permeate 48 has a low concentration of boron ions and constitutes product water.

The second stage of desalination may be defined as a stage of high pH and low brine concentration. The brine 42 discharged from the second stage is about 15–30% of the originally desalinated seawater volume. It has a high concentration of boron and magnesium ions.

According to the present invention, the second stage brine 42 is processed in the third stage RO pressure vessel 50 at low pH values. For this purpose, before the third stage, acid 52 is added to the feedwater 54 so as to reduce its pH to about 6. Due to the low pH value, the $Mg^{++}$ cations cannot cause crystallization of $Mg(OH)_2$ on the membrane surface even at a very high concentration and are rejected with the third stage brine 56. For the same reason of low pH, the boron ions are only weakly rejected and remain with the third stage permeate 58. Accordingly, the third stage of desalination may be defined as a stage of low pH and high brine concentration.

The third stage permeate 58 retains high concentration of boron ions and cannot be used as product water. However, it does not contain magnesium cations. This combination of concentrated boron ions and absence of magnesium cations allows further desalination to be carried out at high values of pH>9. The permeate 58 is treated with soda 62 for raising its pH, and is supplied as feedwater 64 to the fourth stage RO pressure vessel 66. In the fourth stage, high yield of product water 70 is obtained. As the permeate 58 from the third stage has very low TDS, the fourth stage brine has a relatively low TDS content and may be used for the desalination plant internal needs such as membrane flushing and cleaning. The fourth stage of desalination may be defined as a stage of high pH and high yield.

The fourth stage permeate 70 has a low concentration of boron ions and constitutes an output product. It may be mixed with the second stage permeate at 71 to obtain final product water 72 with specified salt concentration.

The entrant seawater temperature affects the degree of boron rejection at the RO membranes and the saturation concentration at which $Mg(OH)_2$ starts to form scale on the RO membranes. The scheme of boron removal in accordance with the present invention advantageously provides a flexible method to maintain a specified boron concentration in the output product at minimal energy consumption. In accordance with this method, a part of the first stage permeate 36 is collected from the high-pressure feed side of the RO vessel 34. This is the so-called front permeate 74 containing about 3 times lesser concentration of boron than the remaining permeate 36. This concentration is still higher than the desired concentration in the output product, but the front permeate 74, when mixed with the second stage permeate 48 and the fourth stage permeate 70, may provide for the specified boron concentration in the final product water 72. The maintenance of the boron concentration is performed by regulating the flow of front permeate 74. At high temperature the flow of front permeate is reduced while at low temperature the flow is increased.

The peculiarities in the design of the second, third, and fourth desalination stages lie in the choice of materials resistant to high or low pH values. The second and the fourth stage components such as high-pressure pipes, seals, membranes, valves must endure pH>9 without corrosion, while the elements of the third stage must endure pH<6.

Although a description of a specific embodiment of the method of the present invention has been presented, it is contemplated that various changes could be made without deviating from the scope of the invention. For example, treatment stages for other purposes may be introduced before, after or in-between the shown RO stages. The method may be used for purification of brackish waters or other boron-contaminated water.

The invention claimed is:

1. A method of boron removal from saline water containing boron and magnesium salts including a multi-stage reverse-osmosis (RO) separation process yielding product water, each stage of said process being carried out in a pressurized vessel with RO membranes separating entrant saline feed water into permeate with low salt concentration and brine with high salt concentration, said method comprising at least the steps of:
    a first stage RO separation at a pH<8.2;
    a second stage RO separation of at least part of the first-stage permeate;
    a third stage RO separation of the second-stage brine;
    wherein the entire second stage separation is carried out at a pH>9 with the brine concentration being limited to a degree preventing $Mg(OH)_2$ scaling on RO membrane surfaces, the permeate constituting product water, and the brine containing boron and magnesium ions;
    the third stage separation is carried out at a weak-acid pH, whereby the bulk of said magnesium ions are separated with the brine, while the bulk of said boron ions are retained in the permeate, and wherein
    the method further comprises a fourth stage of separation of the third-stage permeate, where the bulk of said boron ions is separated from said third-stage permeate, and the permeate of the fourth stage constitutes product water with low boron content.

2. The method of claim 1, wherein final product water with predetermined low boron concentration is obtained by mixing said product water from the second stage and said product water from the fourth stage.

3. The method of claim 1, wherein a part of the permeate at said first RO separation stage is used for obtaining final product water by mixing with said product water from the second stage, by mixing with said product water from the fourth stage, or by mixing with both, said part of the permeate being collected from membranes at the upstream side of the RO vessel a front permeate having a lower concentration of boron than the rest of the permeate.

4. The method of claim 3, wherein the concentration of boron in the final product water is maintained at a predetermined level by regulating the collection of said front permeate depending on the entrant saline feedwater temperature, whereby the higher the entrant saline feedwater temperature, the lower the collection rate.

5. The method of claim 1, wherein said fourth stage separation is carried out in a pressurized vessel with RO membranes at a pH>9.

6. The method of claim 1, said saline water also containing calcium salts in said second stage separation and wherein the brine concentration is limited to prevent $CaCO_3$ scaling on RO membrane surfaces, the brine of the second stage separation also containing calcium ions and wherein in said third stage separation the bulk of said calcium ions are separated with the brine.

7. A method of boron removal from saline water containing boron and calcium salts including a multi-stage reverse-osmosis (RO) separation process yielding product water, each stage of said process being carried out in a pressurized vessel with RO membranes separating entrant saline feed water into permeate with low salt concentration and brine with high salt concentration, said method comprising at least the steps of:
    a first stage RO separation at a pH<8.2;
    a second stage RO separation of at least part of the first-stage permeate;
    a third stage RO separation of the secondstage brine;
    wherein the entire second stage separation is carried out at a pH>9 with the brine concentration being limited to a degree preventing $CaCO_3$ scaling on RO membrane surfaces, the permeate constituting product water, and the brine containing boron and calcium ions;
    the third stage separation is carried at weak-acid pH, whereby the bulk of said calcium ions are separated with the brine, while the bulk of said boron ions are retained in the permeate, and wherein
    the method further comprises a fourth stage of separation of the third-stage permeate, where the bulk of said boron ions is separated from said thirdstage permeate, and the permeate of the fourth stage constitutes product water with low boron content.

8. The method of claim 7, wherein final product water with predetermined low boron concentration is obtained by mixing said product water from the second stage and said product water from the fourth stage.

9. The method of claim 7, wherein a part of the permeate at said first RO separation stage is used for obtaining final product water by mixing with said product water from the second stage, by mixing with said product water from the fourth stage, or by mixing with both, said part of the permeate being collected from membranes at the upstream side of the RO vessel comprising a front permeate having a lower concentration of boron than the rest of the permeate.

10. The method of claim 9, wherein the concentration of boron in the final product water is maintained at a predetermined level by regulating the collection of said front permeate depending on the entrant saline feedwater temperature, wherein the higher the temperature of the entrant saline feedwater, the lower the collection rate.

11. The method of claim 7, wherein said fourth stage separation is carried out in a pressurized vessel with RO membranes at a pH>9.

12. A method of boron removal from saline water containing boron and magnesium salts including a multi-stage reverse-osmosis (RO) separation process yielding product water, each stage of said process being carried out in a pressurized vessel with RO membranes separating entrant saline feed water into permeate with low salt concentration and brine with high salt concentration, said method comprising at least the steps of:
    a first stage RO separation at pH<8.2;
    a second stage RO separation of at least part of the first-stage permeate;

a third stage RO separation of the second-stage brine; wherein the entire second stage separation is carried out at a pH>9 with the brine concentration being limited to a degree preventing $Mg(OH)_2$ scaling on RO membrane surfaces, the permeate constituting product water, and the brine containing boron and magnesium ions, said second stage separation taking place within a single vessel;

the third stage separation is carried out at a weak-acid pH, whereby the bulk of said magnesium ions are separated with the brine, while the bulk of said boron ions are retained in the permeate, and wherein the method further comprises a fourth stage of separation of the third-stage permeate, where the bulk of said boron ions is separated from said third-stage permeate, and the permeate of the fourth stage constitutes product water with low boron content.

* * * * *